United States Patent
Sekine

(10) Patent No.: US 8,248,496 B2
(45) Date of Patent: Aug. 21, 2012

(54) IMAGE PROCESSING APPARATUS, IMAGE PROCESSING METHOD, AND IMAGE SENSOR

(75) Inventor: Hisato Sekine, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 330 days.

(21) Appl. No.: 12/720,524

(22) Filed: Mar. 9, 2010

(65) Prior Publication Data

US 2010/0231755 A1 Sep. 16, 2010

(30) Foreign Application Priority Data

Mar. 10, 2009 (JP) .................................. 2009-056550
Mar. 10, 2009 (JP) .................................. 2009-056726

(51) Int. Cl.
*H04N 5/335* (2011.01)
(52) U.S. Cl. ...................................... 348/278; 348/222.1
(58) Field of Classification Search .................. 348/272, 348/273, 278, 280, 222.1
See application file for complete search history.

(56) References Cited

U.S. PATENT DOCUMENTS

| | | | |
|---|---|---|---|
| 5,373,322 A | 12/1994 | Laroche et al. | |
| 5,889,554 A * | 3/1999 | Mutze | 348/273 |
| 2010/0201853 A1* | 8/2010 | Ishiga | 348/280 |
| 2011/0134291 A1* | 6/2011 | Rueckert et al. | 348/280 |

FOREIGN PATENT DOCUMENTS

| | | |
|---|---|---|
| JP | 08-298669 A | 11/1996 |
| JP | 2003-087806 A | 3/2003 |

* cited by examiner

*Primary Examiner* — Tuan Ho
(74) *Attorney, Agent, or Firm* — Carter, DeLuca, Farrell & Schmidt LLP

(57) ABSTRACT

An image processing apparatus includes a unit to obtain mosaic image data by shooting a subject with use of a color image sensor in which five or more kinds of color filters are arranged in front of an image pickup device; a first interpolator to perform interpolation to color information of a high-definition color filter, in regard to the obtained mosaic image data; and a second interpolator to perform interpolation to color information of a low-definition color filter of which a peak wavelength in spectral transmittance is adjacent to that of the high-definition color filter, by using a result of the interpolation by the first interpolator, wherein the mosaic image data is image data which has one color information for each pixel, and the five or more kinds of color filters include the plural high-definition color filters and the plural low-definition color filters, thereby performing demosaicing without deteriorating definition.

13 Claims, 8 Drawing Sheets

FIG. 6

| LG₁₁ | DG₁₂ | R₁₃ | DG₁₄ | LG₁₅ |
|------|------|-----|------|------|
| B₂₁ | O₂₂ | G₂₃ | O₂₄ | B₂₅ |
| R₃₁ | DG₃₂ | LG₃₃ | DG₃₄ | R₃₅ |
| G₄₁ | O₄₂ | B₄₃ | O₄₄ | G₄₅ |
| LG₅₁ | DG₅₂ | R₅₃ | DG₅₄ | LG₅₅ |

FIG. 7

| X₁₁ | DG₁₂ | X₁₃ | DG₁₄ | X₁₅ |
|-----|------|-----|------|-----|
| DG₂₁ | X₂₂ | DG₂₃ | X₂₄ | DG₂₅ |
| X₃₁ | DG₃₂ | X₃₃ | DG₃₄ | X₃₅ |
| DG₄₁ | X₄₂ | DG₄₃ | X₄₄ | DG₄₅ |
| X₅₁ | DG₅₂ | X₅₃ | DG₅₄ | X₅₄ |

| $X_{11}$ | $X_{12}$ | $R_{13}$ | $X_{14}$ | $X_{15}$ |
|---|---|---|---|---|
| $X_{21}$ | $X_{22}$ | $X_{23}$ | $X_{24}$ | $X_{25}$ |
| $R_{31}$ | $X_{32}$ | $X_{33}$ | $X_{34}$ | $R_{35}$ |
| $X_{41}$ | $X_{42}$ | $X_{43}$ | $X_{44}$ | $X_{45}$ |
| $X_{51}$ | $X_{52}$ | $R_{53}$ | $X_{54}$ | $X_{55}$ |

IMAGE PROCESSING APPARATUS, IMAGE PROCESSING METHOD, AND IMAGE SENSOR

BACKGROUND OF THE INVENTION

1. Field of the Invention

The present invention relates to a color image sensor in which five or more kinds of color filters are arranged in front of an image pickup device, and to an apparatus which performs a demosaicing process to obtained mosaic image data by using the color image sensor in which the five or more kinds of color filters are arranged in front of the image pickup device.

2. Description of the Related Art

In an apparatus such as a digital camera, a digital video camera or the like which inputs an color image, a single-chip color image sensor which uses a solid-state image sensing device such as a CCD (charge coupled device), a CMOS (complementary metal-oxide semiconductor) sensor or the like is used in a general way. Further, in the apparatus like this, color filters which respectively have different characteristics of spectral transmittance are arranged in front of the solid-state image sensing device, whereby color information according to input light is generated. Generally, in the apparatus like this, the color filters which have spectral transmittances respectively corresponding to red (R), green (G) and blue (B) are periodically arranged at a rate of R:G:B=1:2:1 with respect to every 2×2 pixels (for example, U.S. Pat. No. 5,373,322).

Incidentally, an image which is output from the single-chip color image sensor like this is a so-called mosaic image which has only single color information with respect to each pixel. For this reason, other color information which is lacking in each of the pixels constituting the mosaic image is generated by performing interpolation based on the color information of other pixels (hereinafter, called demosaicing), whereby the color information of each of R, G and B is generated with respect to one pixel. In any case, as a method of performing the demosaicing, there is widely known a method of performing, to obtain other color information which cannot be obtained in each pixel, spatial interpolation based on color information of environmental pixels (for example, Japanese Patent Application Laid-Open No. 2003-087806).

On one hand, there is a camera which is called a multiband camera. The multiband camera aims to reproduce spectral information of a subject by using plural kinds of color filters. For this reason, the multiband camera improves reproduction accuracy of the spectral information by increasing the number of kinds of color filters which respectively have different peak wavelengths of spectral transmittances and different full widths at half maximum.

In a single-chip multiband camera in which color filters are arranged in front of a solid-state image sensing device, it is necessary to provide and arrange plural kinds of color filters in front of the solid-state image sensing device. For example, as a multiband camera in which five or more kinds of color filters are arranged on one solid-stage image sensing device, there is known a multiband camera in which color filters are vorticosely arranged in order of peak wavelength.

In a case where the color filters are vorticosely arranged, satisfactory demosaicing can be performed by using peripheral pixel information in an area where the color filters having adjacent peak wavelengths are adjacent to each other. However, in areas other than the area where the color filters having the adjacent peak wavelengths are adjacent to each other, color filters having adjacent peak wavelengths are not adjacent to each other. For this reason, in the case where demosaicing is performed, if an image which has a high spatial frequency is input, a color which is called a false color different from an original color is reproduced. As a result, a spatial frequency (i.e., definition or resolution) which can be accurately resolved deteriorates.

Further, the method disclosed in Japanese Patent Application Laid-Open No. 2003-087806 premises that three kinds of color filters, i.e., R, G and B filters, are used. Consequently, if the number of kinds of color filters to be used increases, it is impossible to prevent deterioration of the definition due to the demosaicing.

SUMMARY OF THE INVENTION

The present invention performs demosaicing without deteriorating definition, by using five or more kinds of color filters.

according to an aspect of the present invention, there is provided an image processing apparatus including an obtaining unit configured to obtain mosaic image data by shooting a subject with use of a color image sensor in which five or more kinds of color filters are arranged in front of an image pickup device; a first interpolation unit configured to perform interpolation to color information of a high-definition color filter, in regard to the mosaic image data obtained by the obtaining unit; and a second interpolation unit configured to perform interpolation to color information of a low-definition color filter of which a peak wavelength in spectral transmittance is adjacent to that of the high-definition color filter, by using a result of the interpolation to the color information of the high-definition color filter by the first interpolation unit, wherein the mosaic image data is image data which has one color information for each pixel, and the five or more kinds of color filters include the plural high-definition color filters and the plural low-definition color filters.

According to another aspect of the present invention, there is provided a color image sensor which can perform demosaicing without deteriorating definition by providing a color image sensor in which five or more kinds of color filters of which peak wavelengths in spectral transmittance or full widths at half-maximum are different from others are arranged in front of an image pickup device, wherein, among the five or more kinds of color filters, a first color filter and a second color filter each of which has definition higher than those of other arranged color filters are arranged alternately in a predetermined direction, the first color filter and the color filter of which the peak wavelength in the spectral transmittance is adjacent to that of the first color filter are arranged alternately in a predetermined direction, and the second color filter and the color filter of which the peak wavelength in the spectral transmittance is adjacent to that of the second color filter are arranged alternately in a predetermined direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain principles of the invention.

FIG. 6 illustrates an example of a color filter arrangement of an area of 5×5 pixels.

FIG. 7 illustrates an example of a calculated distribution of pixel values of DG (dark green) in the area of 5×5 pixels.

DESCRIPTION OF THE EMBODIMENTS

As many apparently widely different embodiments of the present invention can be made without departing from the spirit and scope thereof, it is to be understood that the invention is not limited to the specific embodiments thereof except as defined in the appended claims.

Hereinafter, the exemplary embodiments of the present invention will be described in detail with reference to the attached drawings. Incidentally, in the exemplary embodiments of the present invention, an electronic still camera will be described by way of example as an image processing apparatus which is equipped with a color image sensor according to the present invention.

First Embodiment

Figure 1:
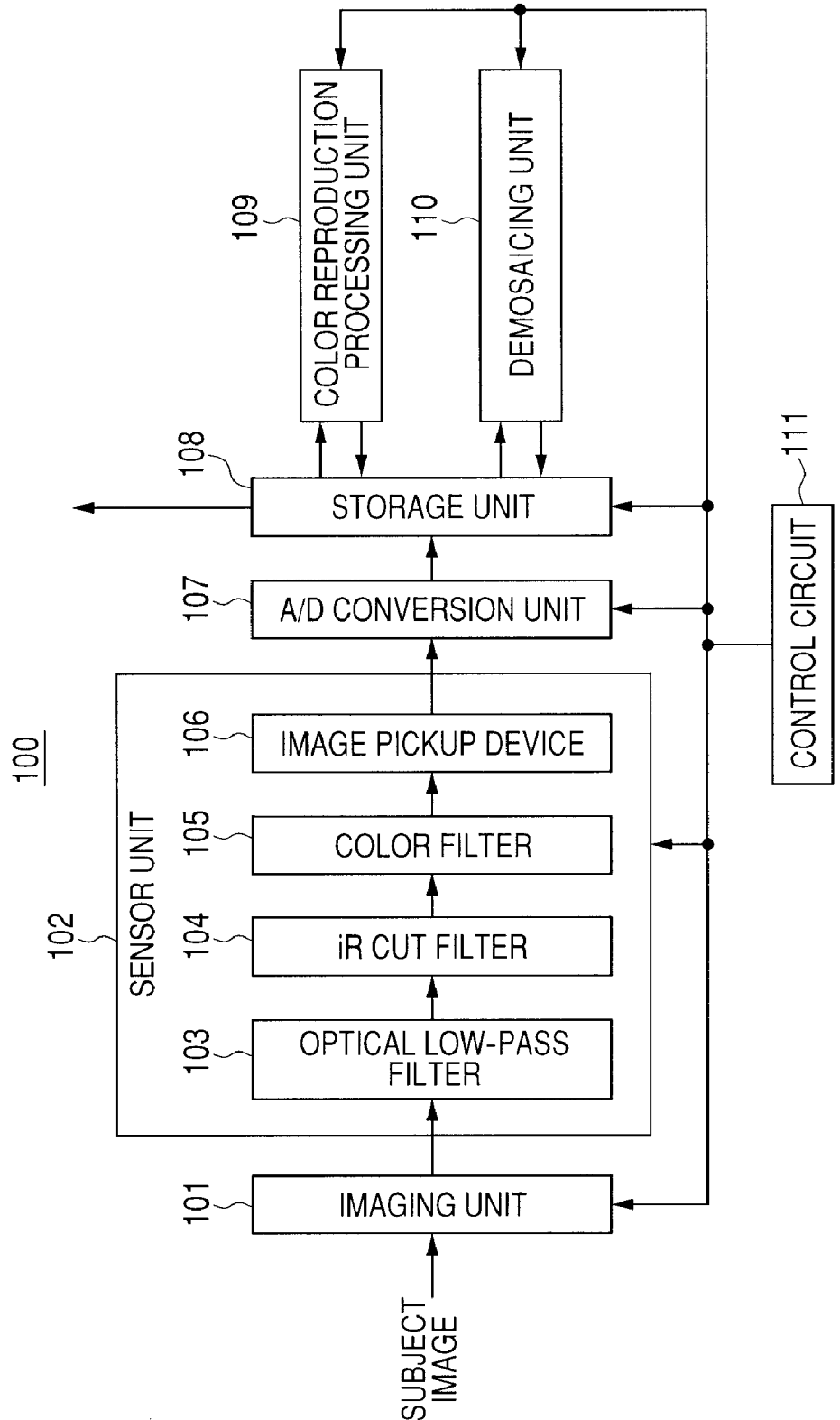
FIG. 1 is a block diagram illustrating an example configuration of an electronic still camera.

FIG. 1 is a block diagram illustrating an example configuration of an electronic still camera 100 according to the present embodiment. As illustrated in FIG. 1, a control circuit 111 is connected to an imaging unit 101, a sensor unit 102, an A/D (analog-to-digital) conversion unit 107, a storage unit 108, a color reproduction processing unit 109, and a demosaicing unit 110 so as to control these units.

The imaging unit 101 includes a shooting lens and the like. The sensor unit 102 includes an optical low-pass filter 103, an iR (infrared) cut filter 104, a color filter 105 and an image pickup device 106. Here, an optical image which is obtained from a subject (a subject image) is input to the image pickup device 106 through the optical low-pass filter 103, the iR cut filter 104 and the color filter 105.

The image pickup device 106 is connected to the A/D conversion unit 107, and the A/D conversion unit 107 is connected to the storage unit 108. The storage unit 108 is connected to the color reproduction processing unit 109 and the demosaicing unit 110, and a signal which is output from the demosaicing unit 110 is stored in the storage unit 108.

Figure 2:
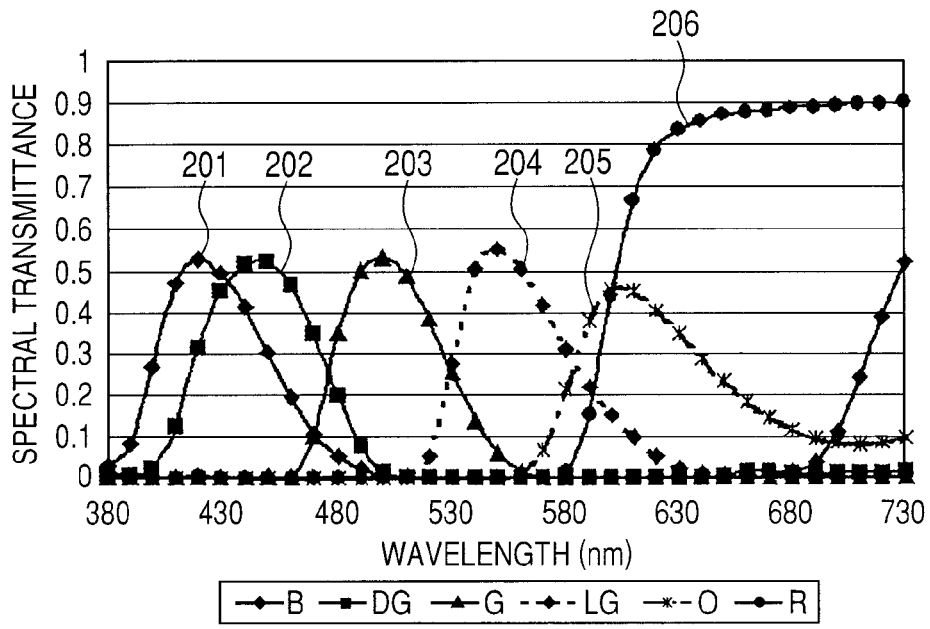
FIG. 2 illustrates respective peaks of wavelengths in six kinds of color filters.

FIG. 2 illustrates respective peaks of wavelengths (respective peak wavelengths) in six kinds of color filters. Hereinafter, the present embodiment will be described by using the six kinds of color filters respectively having different spectral transmittances as illustrated in FIG. 2. As illustrated in FIG. 2, it is assumed that the six kinds of color filters consist of a B (blue) filter, a DG (dark green) filter, a G (green) filter, an LG (light green) filter, an O (orange) filter and an R (red) filter respectively having peak wavelengths 201, 202, 203, 204, 205 and 206 in order of length.

Figure 3:
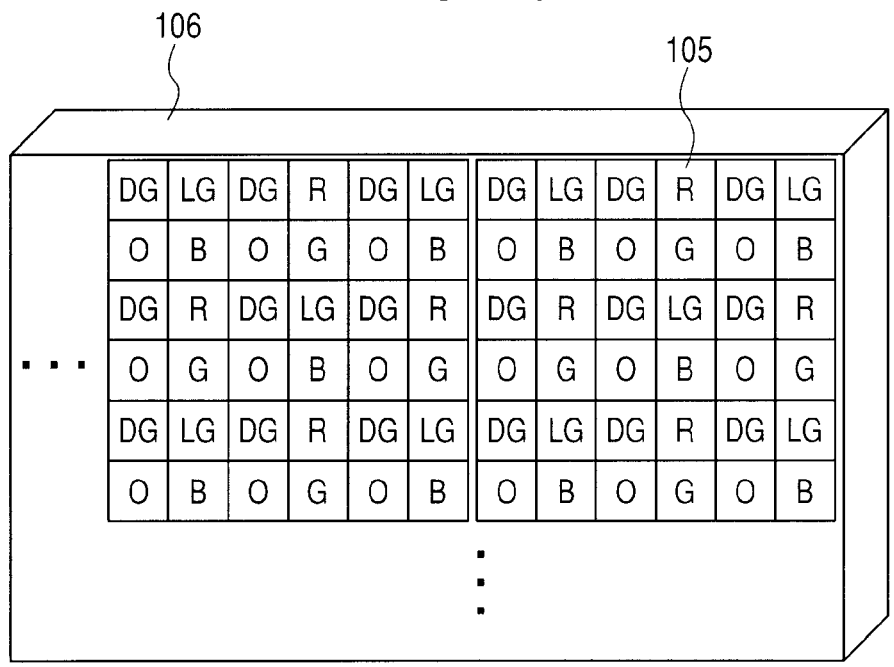
FIG. 3 illustrates an example of a color filter arrangement according to the first embodiment of the present invention.

FIG. 3 illustrates an example of the arrangement of the color filter 105 according to the present embodiment. As illustrated in FIG. 3, the color filter 105 is arranged in front of the image pickup device 106. Further, in the color filter 105, the six kinds of color filters are arranged at a rate of B:DG: G:LG:O:R=1:2:1:1:2:1. Hereinafter, it is assumed that, among the six kinds of color filters, the DG filter and the O filter having the large rate of numbers are called high-definition color filters and the color filters other than the DG filter and the O filter are called low-definition color filters. As illustrated in FIG. 2, it should be noted that the high-definition color filters are the color filters other than the color filter having the shortest peak wavelength in the spectral transmittance and the color filter having the longest peak wavelength in the spectral transmittance.

Further, as illustrated in FIG. 3, the DG filters acting as first color filters and the O filters acting as second color filters are arranged to constitute the Bayer arrangement (that is, the DG filter and the O filter are arranged alternately in a predetermined direction). Furthermore, the color filters of which the peak wavelengths in the spectral transmittance are adjacent to those of the DG filters and the O filters are arranged to constitute the Bayer arrangement. More specifically, the DG filter and the color filter of which the peak wavelength in the spectral transmittance is adjacent to that of the DG filter are arranged alternately in a predetermined direction, and the O filter and the color filter of which the peak wavelength in the spectral transmittance is adjacent to that of the O filter are arranged alternately in a predetermined direction. If it is assumed that the DG, B and G filters together constitute a first filter group and the O, LG and R filters together constitute a second filter group, the first filter group and the second filter group are arranged to constitute the Bayer arrangement.

Hereinafter, the concrete operation to be performed in an image processing method according to the present embodiment will be described with reference to FIGS. 1 and 2.

First, an optical image which is obtained from a subject image is input to the sensor unit 102 through the imaging unit 101. Then, the optical image input to the sensor unit 102 is further input to the image pickup device 106 through the optical low-pass filter 103, the iR cut filter 104 and the color filter 105. In the image pickup device 106, the input optical image is subjected to photoelectric conversion to generate signal charge. Further, in the image pickup device 106, the signal charge thus generated is scanned to generate an image signal, and the image signal thus generated is output to the A/D conversion unit 107.

In the A/D conversion unit 107, the input image signal is subjected to A/D conversion to generate mosaic image data. It should be noted that such a process of generating the mosaic image data as described above is controlled by the control circuit 111. In the present embodiment, the mosaic image data is output in correspondence with each of the pixels constituting the image pickup device 106. Then, the output mosaic image data is input to the storage unit 108. In the storage unit 108, the mosaic image data is divided with respect to each of the plural kinds of color filters, and the divided mosaic image data are respectively stored in the areas corresponding to the respective kinds of color filters.

Demosaicing-processed image data (described below), which was processed by the demosaicing unit 110, is stored in the storage unit 108.

In the demosaicing unit 110, the mosaic image data stored in the storage unit 108 is subjected to demosaicing, and the obtained demosaicing-processed image data is again stored in the storage unit 108. Then, in the color reproduction processing unit 109, the demosaicing-processed image data stored in the storage unit 108 is subjected to various color reproduction processes such as a spectral image process, an edge emphasis process, a noise reduction process, and the like.

<Demosaicing Unit 110>

The process to be performed by the demosaicing unit 110 is described below with reference to flow charts illustrated in FIGS. 4 and 5.

Figure 4:
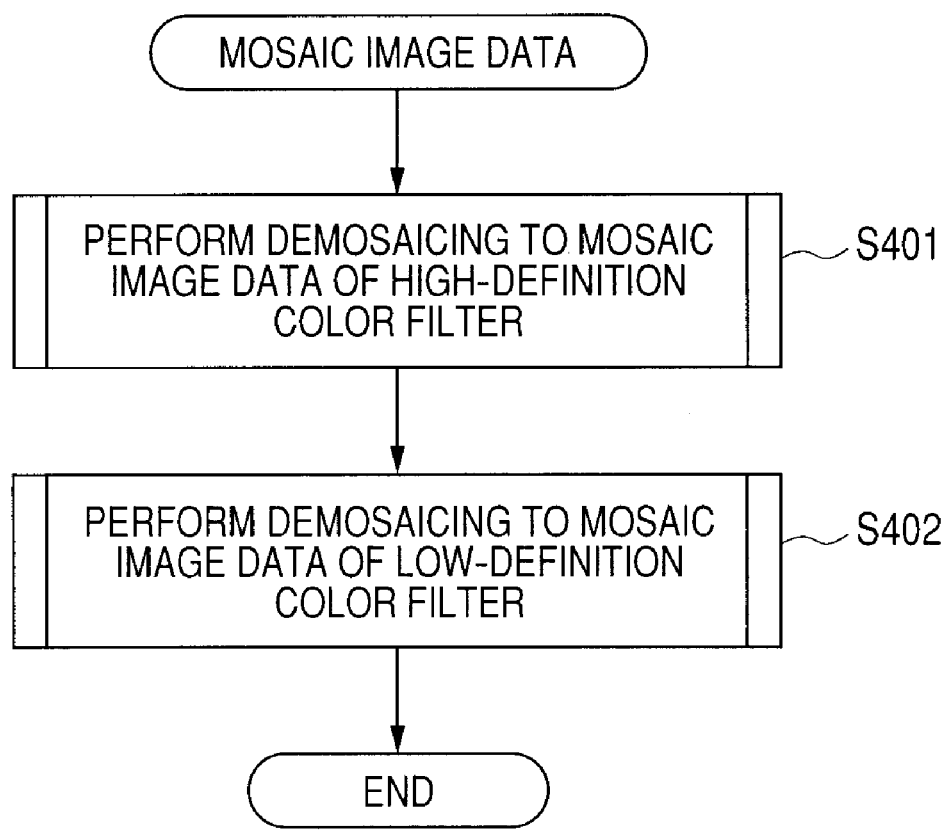
FIG. 4 is a flow chart illustrating an example of a procedure of a process to be performed by a demosaicing unit.

First, in step S401 illustrated in FIG. 4, the demosaicing unit 110 functions as a first interpolation unit that performs the demosaicing to the mosaic image data of the high-definition color filter. Then, in step S402, the demosaicing unit 110 functions as a second interpolation unit that performing the demosaicing to the mosaic image data of the low-definition color filter.

<Demosaicing to be Performed to Mosaic Image Data of High-Definition Color Filter>

The demosaicing to the mosaic image data of the high-definition color filter performed in step S401 is described in detail below with reference to the flow chart illustrated in FIG. 5.

In the present embodiment, continuous processes in steps S501, S502, S503, S504, S505, S506, S507, S508 and S509 are performed independently to each of O and DG being the color information of the high-definition color filters.

Here, the processes in steps S501 to S505 are be described with reference to FIG. 6 which illustrates an example of the color filter arrangement of an area of 5×5 pixels extracted from the floor filter. For example, the O filters are used as the high-definition color filter, the pixel at the position of $LG_{33}$ is used as a noticed pixel, and a process of calculating the pixel value of the O color information ($O_{33}$) of the noticed pixel is used in the description of FIG. 6.

First, in step S501, it is determined whether or not the pixel of the high-definition color filter exists at the position obliquely adjacent to the noticed pixel. Then, if it is determined that the pixel of the high-definition color filter exists at the position obliquely adjacent to the noticed pixel, the flow advances to step S502. On the other hand, if it is determined in step S501 that the pixel of the high-definition color filter does not exist at the position obliquely adjacent to the noticed pixel, the flow advances to step S504.

In step S502, a local area average value of the high-definition color filters is calculated by centering on the noticed pixel.

In the example illustrated in FIG. 6, the pixels of the O color information exist respectively at the positions obliquely adjacent to the noticed pixel, and the flow advances to step S502. Then, in step S502, a local area average value $O_{33}lpf$ of the high-definition color filters by centering on the noticed pixel is calculated by the following equation (1).

$$O_{33}lpf=|O_{22}+O_{24}+O_{42}+O_{44}|/4 \quad (1)$$

Then, in step S503, a local area average value of the low-definition color filters of which the peak wavelengths are adjacent to those of the high-definition color filters is calculated by centering on the noticed pixel. In the example illustrated in FIG. 6, a local area average value $LG_{33}lpf$ of the low-definition color filters LG is calculated by the following equation (2). Here, it should be noted that, in case of obtaining the local area average value, a weighting factor based on the distance between the noticed pixel and the target pixel is used.

$$LG_{33}lpf=(4\times LG_{33}+LG_{11}+LG_{15}+LG_{51}+LG_{55})/8 \quad (2)$$

Subsequently, in step S504, the pixel value of the noticed pixel is calculated by using the local area average values respectively calculated in step S502 and step S503. At that time, it is assumed in the present embodiment that ratios of the average values of the color filters of which the peak wavelengths are adjacent to each other are the same in the local area. In the example illustrated in FIG. 6, the pixel value of $O_{33}$ is calculated by the following equation (3).

$$O_{33}=O_{33}lpf/LG_{33}lpf\times LG_{33} \quad (3)$$

Subsequently, in step S505, it is determined whether or not the processes in steps S501 to S504 were performed for all the pixels. If it is determined that the processes in steps S501 to S504 were performed for all the pixels, the flow advances to step S506. On the other hand, if it is determined in step S505 that the processes in steps S501 to S504 are not yet performed for all the pixels, that is, if it is determined that a pixel which is not yet processed exists, the flow returns to step S501, and the processes in steps S501 to S504 are performed to the relevant pixel.

As described above, if the processes in steps S501 to S505 are performed respectively to the O and DG filters, in the example illustrated in FIG. 6, the pixel value of O is obtained in the pixel $X_{mn}$ in which both m and n are odd numbers or even numbers. On the other hand, the pixel value of DG is obtained in the pixel $X_{mn}$ in which m and n make a combination of odd number and even number. Consequently, in order to obtain the pixel values of O and DG in all the pixels, the following processes in steps S506 to S509 are performed.

The processes in steps S506 to S509 will be described with reference to FIG. 7. In the following, an example of calculating the pixel values of the DG filters being the high-definition color filters will be described. Here, it should be noted that each "X" in FIG. 7 indicates the pixel in which the pixel value of DG is not yet calculated.

In step S506, it is determined whether or not the pixel values of all the high-definition color filters exist in the noticed pixel. If it is determined that the pixel values of all the high-definition color filters exist in the noticed pixel, the flow advances to step S509. On the other hand, if it is determined in step S506 that the pixel values of all the high-definition color filters do not exist in the noticed pixel, that is, if there is the pixel value of the high-definition color filter which has no value, the flow advances to step S507. In the example illustrated in FIG. 6, it is determined whether or not the pixel values of both the O and DG filters exist in the noticed pixel.

Then, in step S507, differences of the pixels in the horizontal direction and the vertical direction of the noticed pixel. For example, in case of calculating the pixel value of the pixel $X_{33}$, a difference $HDiff_{33}$ in the horizontal direction and a difference $VDiff_{33}$ in the vertical direction are calculated respectively by the following equations (4) and (5).

$$HDiff_{33}=|DG_{32}-DG_{34}| \quad (4)$$

$$VDiff_{33}=|DG_{23}-DG_{43}| \quad (5)$$

Subsequently, in step S508, the direction in which a change is gradual is detected by using the difference in the horizontal direction and the difference in the vertical direction respectively calculated in step S507, and the pixel value of the noticed pixel is calculated based on such a detected result. For example, in a case where $HDiff_{33}<VDiff_{33}$, it is estimated that the change in the horizontal direction is gradual as compared with the change in the vertical direction, whereby $DG_{33}$ is calculated by the following equation (6).

$$DG_{33}=(DG_{32}+DG_{34})/2 \quad (6)$$

On the other hand, in a case where $HDiff_{33}>VDiff_{33}$, it is estimated that the change in the vertical direction is gradual as compared with the change in the horizontal direction, whereby $DG_{33}$ is calculated by the following equation (7).

$$DG_{33}=(DG_{23}+DG_{43})/2 \quad (7)$$

In a case where the pixel value of O does not exist in the noticed pixel (the pixels of DG in FIG. 7), the pixel value of O of the noticed pixel is likewise calculated by using the difference in the horizontal direction and the difference in the vertical direction.

Subsequently, in step S509, it is determined whether or not the processes in steps S506 to S508 were performed for all the pixels. Then, if it is determined that the processes in steps S506 to S508 were performed for all the pixels, the process ends. On the other hand, if it is determined in step S509 that the processes in steps S506 to S508 are not yet performed for all the pixels, that is, if it is determined that a pixel which is not yet processed exists, the flow returns to step S506, and the processes in steps S506 to S508 are performed for the relevant pixel.

Figure 5:
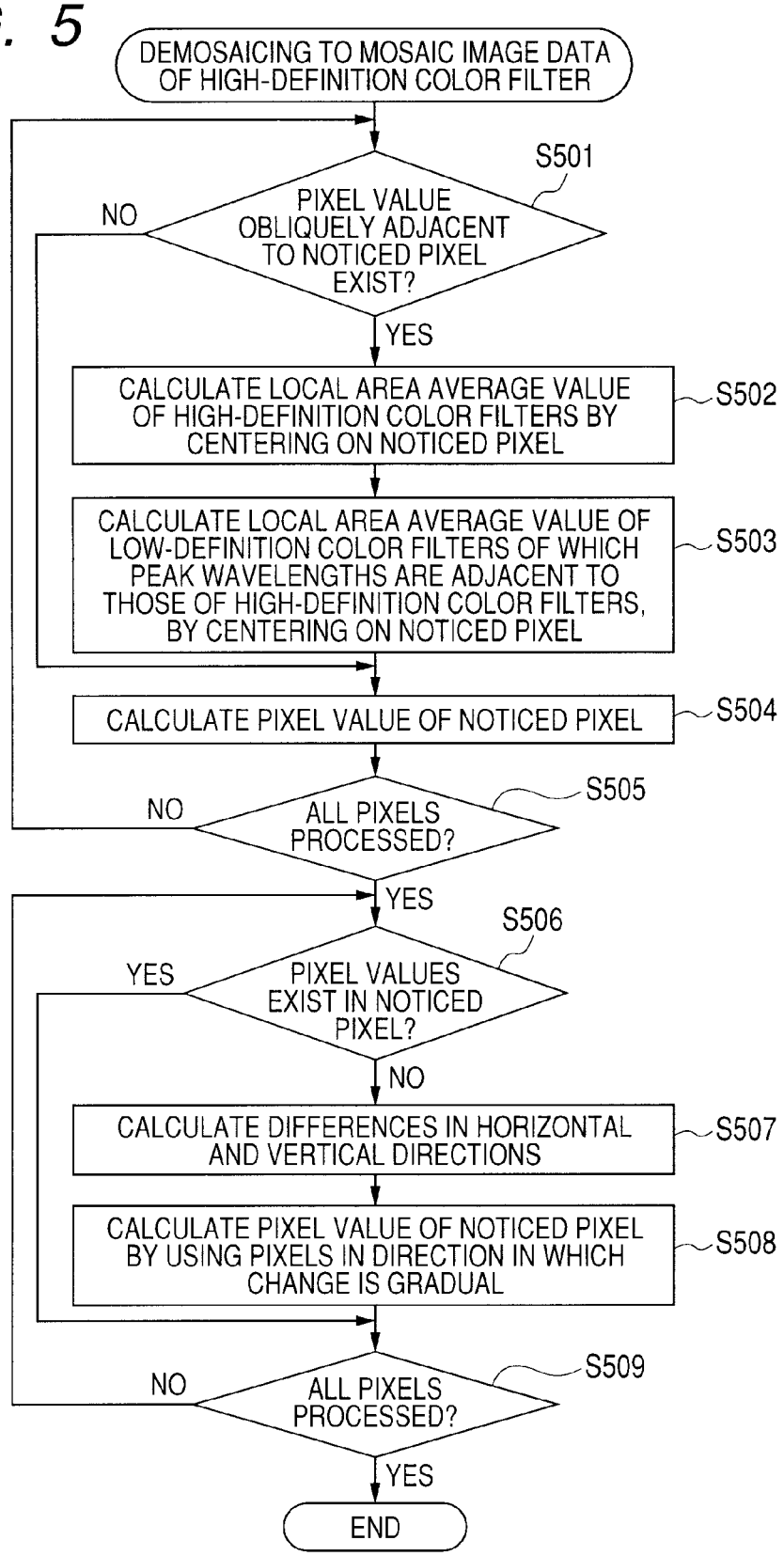
FIG. 5 is a flow chart illustrating an example of a procedure of a demosaicing process to be performed to a high-definition color filter.

As just described, it is possible by performing the processes as illustrated in the flow chart of FIG. 5 to obtain the pixel values of the O and DG filters being the high-definition color filters in all the pixels.

It should be noted that either O or DG may be calculated precedently. For example, it is possible to calculate only O by the processes in steps S501 to S509 and thereafter calculate DG by the processes in steps S501 to S509. Otherwise, it is possible to calculate O and DG respectively by the processes in steps S501 to S505 and thereafter again calculate O and DG respectively by the processes in steps S506 to S509.

<Demosaicing to be Performed to Mosaic Image Data of Low-Definition Color Filter>

Here, the demosaicing to the mosaic image data of the low-definition color filter to be performed in step S402 will be described in detail with reference to the flow chart illustrated in FIG. 8 and the diagram illustrated in FIG. 9 which illustrates an example of a calculated distribution of the pixel values of R being the low-definition color filters in the area of 5×5 pixels. It should be noted that each "X" in FIG. 9 indicates the pixel in which the pixel value of the low-definition color filter is not yet calculated. In the following, an example of calculating the pixel values of the R filters being the low-definition color filter will be described.

Figure 8:
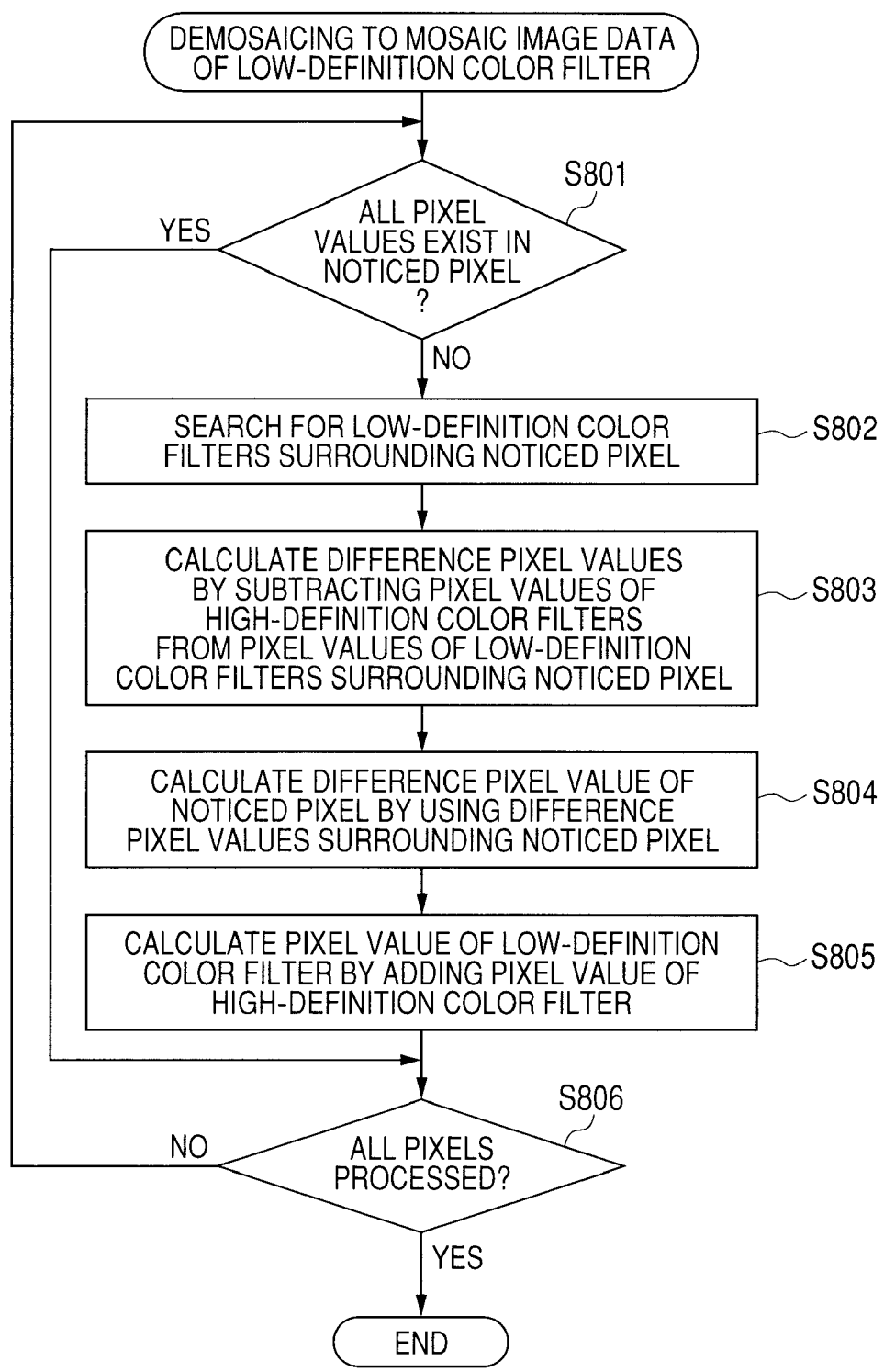
FIG. 8 is a flow chart illustrating an example of a procedure of the demosaicing process to be performed to a low-definition color filter.

First, in step S801 illustrated in FIG. 8, it is determined whether or not the pixel values of all the low-definition color filters exist in the noticed pixel. If it is determined that the pixel values of all the low-definition color filters exist in the noticed pixel, the flow advances to step S806. On the other hand, if it is determined in step S801 that the pixel values of all the low-definition color filters do not exist in the noticed pixel, that is, if there is the pixel value of the low-definition color filter which has no value, the flow advances to step S802.

Next, in step S802, the pixel which has the pixel value of the low-definition color filter having no pixel value is searched from among the pixels surrounding the noticed pixel. For example, in FIG. 9, if it is assumed that the pixel $X_{33}$ is the noticed pixel and the pixel value of R of $X_{33}$ is the target to be calculated, the pixels $R_{13}, R_{31}, R_{35}$ and $R_{53}$ are the pixels of the low-definition color filters surrounding the noticed pixel.

Subsequently, in a step S803, difference pixel values are calculated by subtracting the pixel values of the high-definition color filters of which the peak wavelengths are adjacent from the pixel values of the low-definition color filters surrounding the noticed pixel. Here, if the low-definition color filter is R, the high-definition color filter of which the peak wavelength is adjacent is O. Therefore, in the case where the noticed pixel is $X_{33}$, difference pixel values $D_{13}, D_{31}, D_{35}$ and $D_{53}$ of the surrounding pixels are calculated by the following equations (8) to (11).

$$D_{13}=R_{13}-O_{13} \quad (8)$$

$$D_{31}=R_{31}-O_{31} \quad (9)$$

$$D_{35}=R_{35}-O_{35} \quad (10)$$

$$D_{53}=R_{53}-O_{53} \quad (11)$$

Subsequently, in a step S804, the difference pixel value of the noticed pixel is calculated by using the difference pixel values of the surrounding pixels calculated in step S803. More specifically, in the case where the noticed pixel is $X_{33}$, a difference pixel value $D_{33}$ of the noticed pixel is calculated by using the difference pixel values $D_{13}, D_{31}, D_{35}$ and $D_{53}$ of the pixels surrounding the noticed pixel, according to bilinear interpolation or the like which is a general interpolation method.

Next, in step S805, the pixel value of the high-definition color filter is added to the difference pixel value of the noticed pixel calculated in step S804. More specifically, in the case where the noticed pixel is $X_{33}$, the pixel value of $R_{33}$ is calculated by the following equation (12).

$$R_{33}=D_{33}+O_{33} \quad (12)$$

It is possible by the processes in steps S802 to S805 to likewise calculate the pixel values of R with respect to $X_{11}$, $X_{15}, X_{51}$ and $X_{55}$, as well as $X_{33}$. Here, in case of calculating the pixel values of R with respect to $X_{11}, X_{15}, X_{51}$ and $X_{55}$, the pixels in the area which is adjacent to the area of 5×5 pixels illustrated in FIG. 9. Incidentally, in a case where the noticed pixel is $X_{22}, X_{23}$ or $X_{32}$, the pixel values of R cannot be calculated directly by the processes in step S802 to S805. Consequently, the pixel values of $R_{22}, R_{23}$ and $R_{32}$ are calculated instead by using the pixel values of $R_H$ and $R_{33}$ respectively calculated in steps S802 to S805. More specifically, the pixel value of $R_{22}$ is calculated in the procedure same as that in the processes in steps S501 to S505 illustrated in FIG. 5, and the pixel values of $R_{23}$ and $R_{32}$ are calculated in the procedure same as that in the processes in steps S506 to S509 illustrated in FIG. 5.

Consequently, in case of calculating the pixel values of the low-definition color filters, the pixel value of the color capable of being calculated by the processes in steps S802 to S805 is preferentially calculated. For example, in the case where the noticed pixel is $X_{33}$, the pixel values of R are preferentially calculated. On the other hand, in the case where the noticed pixel is $X_{23}$, the pixel values of B are preferentially calculated. Further, in case of calculating the pixel values of the low-definition color filters in $X_{22}$ and $X_{32}$, there is no pixel to be calculated preferentially. Therefore, in this case, after the pixel values of the low-definition color filters are calculated in the pixels surrounding the noticed pixel, the pixel value is calculated in the procedure same as that illustrated in the flow chart of FIG. 5.

Subsequently, in step S806, it is determined whether or not the pixel values of all the low-definition filters were calculated with respect to all the pixels. If it is determined that the pixel values of all the low-definition filters were calculated with respect to all the pixels, the process ends. On the other hand, if it is determined in step S806 that the pixel values of all the low-definition filters are not yet calculated with respect to all the pixels, that is, if it is determined that a pixel of which the pixel value is not yet calculated exists, the flow returns to step S801.

According to the procedure as described above, it is possible in each pixel to calculate the pixel values of the B, G, LG and R filters being the low-definition color filters.

As described above, according to the present embodiment, the demosaicing is performed to the mosaic image in the electronic still camera which is equipped with the six kinds of color filters. At that time, the color filters of which the peak wavelengths are adjacent to those of the high-definition color filters are arranged alternately in the predetermined directions respectively. Thus, the demosaicing is performed to the high-definition color filter by using the pixel value information of the color filter of which the peak wavelength is adjacent. As a result, it is possible to further improve the definition (or the resolution) of the high-definition color filter. Further, the result of the interpolation to be performed to the high-definition color filter is used in regard to the low-definition color filter, which also improves the definition (or the resolution) of the low-definition color filter. In consequence, it is possible to perform satisfactory demosaicing in regard to the mosaic image.

Second Embodiment

Hereinafter, a second embodiment of the present invention will be described. Here, it should be noted that, in the present embodiment, descriptions of the electronic still camera and the processing procedure of demosaicing will not be repeated because they are the same as those in the first embodiment. In the present embodiment, as illustrated in FIG. 10, five kinds of color filters of which the peak wavelengths in spectral transmittance and the full widths at half-maximum are respectively different from others will be described by way of example.

Figures 9, 10:
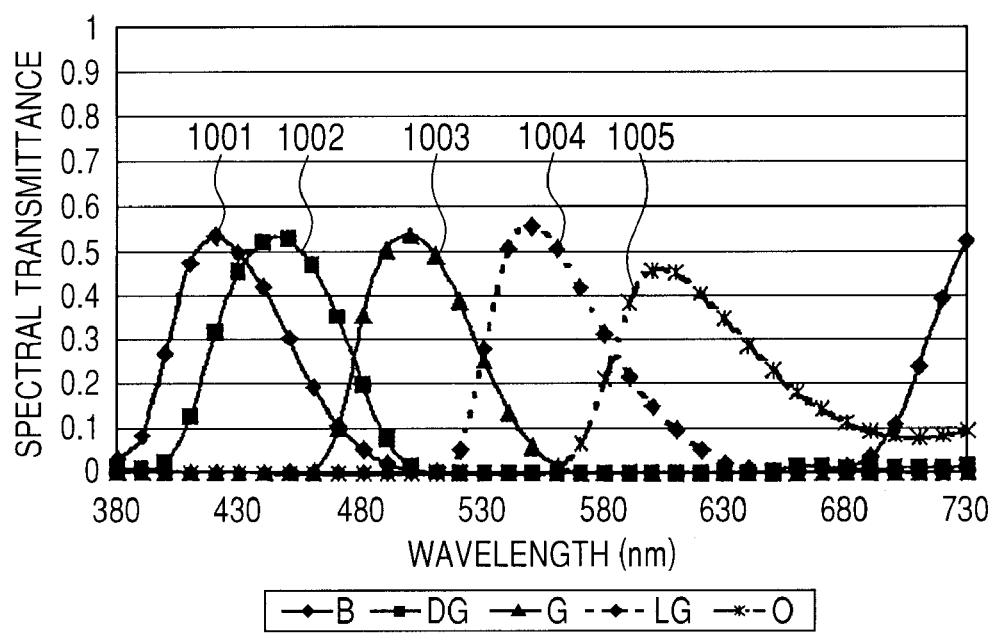
FIG. 9 illustrates an example of a calculated distribution of pixel values of R (red) in the area of 5×5 pixels.
FIG. 10 illustrates respective peaks of wavelengths in five kinds of color filters.

FIG. 10 illustrates respective peaks of wavelengths (i.e., respective peak wavelengths) in the five kinds of color filters. As illustrated in FIG. 10, it is assumed that the five kinds of color filters consist of a B (blue) filter, a DG (dark green) filter, a G (green) filter, an LG (light green) filter and an O (orange) filter respectively having peak wavelengths 1001, 1002, 1003, 1004 and 1005 in order of length.

Figure 11:
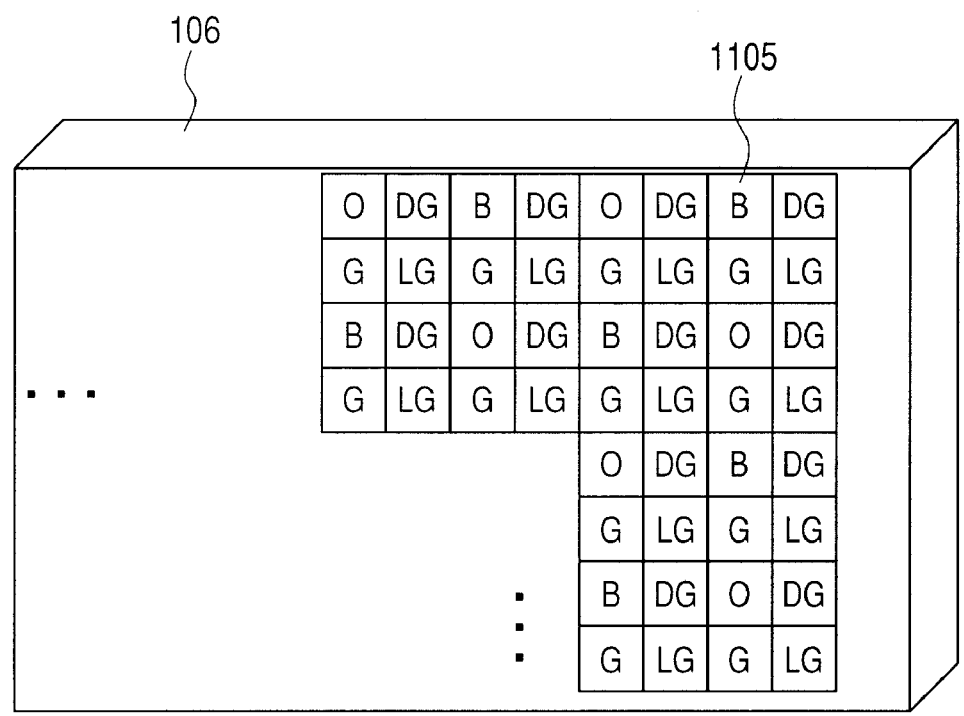
FIG. 11 illustrates an example of a color filter arrangement.

FIG. 11 illustrates an example of the arrangement of a color filter 1105 according to the present embodiment. Here, in the color filter 1105, the five kinds of color filters are arranged at a rate of B:DG:G:LG:O=1:2:2:2:1.

In the present embodiment, since the numbers of the DG filters, the G filters and the LG filters are large in ratio, the DG filters, the G filters and the LG filters are respectively used as the high-definition color filters. In the present embodiment, demosaicing may be performed by using the three kinds of filters, i.e., DG, G and LG filters, as the high-definition color filters. Alternatively, demosaicing may be performed by using the DG and LG filters, the DG and G filters, or the G and LG filters, as the high-definition color filters. In any case, if the demosaicing is first performed in regard to the high-definition color filter and then the demosaicing is performed in regard to the low-definition color filter, any of the DG, G and LG filters may be set as the high-definition color filter.

As just described, according to the present embodiment, the demosaicing is performed to the mosaic image in the electronic still camera which is equipped with the five kinds of color filters. At that time, as well as the electronic still camera which is equipped with the six kinds of color filters, it is possible to perform satisfactory demosaicing to the mosaic image.

The example of the spectral transmittance in the six kinds of color filters is described in the above-described first embodiment, and the example of the spectral transmittance in the five kinds of color filters is described in the above-described second embodiment. However, the present invention is not limited to them. That is, in case of selecting the color filters so as to optimize the spectral transmittance in the five or more kinds of color filters according to a subject, a specification, and/or usage, the present invention is not limited to the above-described combinations of the color filters.

Further, the examples of the rates of the numbers of the used color filters are described respectively in the first and second embodiments. However, the present invention is not limited to these ratios. For example, in the first embodiment, the rate of the six kinds of color filters may be set to B:DG:G:LG:O:R=1:4:4:4:2:1. In this case, as a human sense characteristic, it is possible to effectively obtain the information of an especially high-sensitive wavelength area. In this manner, the ratio of the number of the used color filters may be optimized according to a subject, a specification, and/or usage.

Furthermore, the examples of the arrangements of the color filters are described respectively in the first and second embodiments. However, the present invention is not limited to these arrangements. That is, if the high-definition color filters are arranged to constitute the Bayer arrangement and also the color filters of which the peak wavelengths are adjacent to those of the high-definition color filters are arranged to constitute the Bayer arrangement, the arrangement of the color filters are not limited to the above-described arrangements.

Besides, as the method of performing the demosaicing to the high-definition color filter in the first and second embodiments, the method of performing the calculation by using the average pixel value of the color filters of which the peak wavelengths are adjacent in the local area is described by way of example. However, the present invention is not limited to this method. For example, a method of discriminating a change direction of an image by using the color filters of which the peak wavelengths are adjacent and then performing interpolation by using the pixel value of the image of which the change direction is gradual may be used. Here, in the case where the interpolation is performed, the pixel values themselves of the color filters of which the peak wavelengths are adjacent may be used. Further, a method of performing the interpolation only based on the pixel value information of the high-definition color filter without using the pixel value information of the color filters of which the peak wavelengths are adjacent may be used. Furthermore, a method of performing the demosaicing process can include performing a low-pass filter process in a frequency space by using the Fourier transformation.

In the above-described embodiments, the respective units of the electronic still camera and the respective steps in the demosaicing can be realized if programs stored in a RAM, a ROM or the like in a computer operates. Here, the relevant program may be stored in a computer-readable storage medium.

Further, the embodiment can be carried out as, for example, a system, an apparatus, a method, a storage medium or the like. More specifically, the embodiment may be applied to a system which consists of plural devices or an apparatus which includes only one device.

Program code (software) corresponding to the flow charts illustrated in FIGS. 5 and 8 in the embodiments can be used for realizing the functions of the above-described embodiments. The program code can be directly or remotely supplied to a system or an apparatus. A processor of the system or the apparatus can read the supplied program code and execute the program code to realize the functions of the above-described embodiments.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2009-056550 filed Mar. 10, 2009, and No. 2009-056726 filed Mar. 10, 2009, which are hereby incorporated by references herein in their entirety.

What is claimed is:

1. An image processing apparatus comprising:
an obtaining unit configured to obtain mosaic image data by shooting a subject with use of a color image sensor in which five or more kinds of color filters are arranged in front of an image pickup device;
a first interpolation unit configured to perform interpolation to color information of a high-definition color filter, in regard to the mosaic image data obtained by the obtaining unit; and
a second interpolation unit configured to perform interpolation to color information of a low-definition color filter of which a peak wavelength in spectral transmittance is adjacent to that of the high-definition color filter, by using a result of the interpolation to the color information of the high-definition color filter by the first interpolation unit,
wherein the mosaic image data is image data which has one color information for each pixel, and
the five or more kinds of color filters include high-definition color filters and low-definition color filters.

2. The image processing apparatus according to claim 1, wherein the high-definition color filters include, among the five or more kinds of color filters, the color filters other than the color filter of which the peak wavelength in the spectral transmittance is shortest and the color filter of which the peak wavelength in the spectral transmittance is longest.

3. The image processing apparatus according to claim 1, wherein the first interpolation unit is configured to perform interpolation to the color information by using pixel value information of the high-definition color filter and pixel value information of the color filter of which the peak wavelength in the spectral transmittance is adjacent to that of the high-definition color filter.

4. The image processing apparatus according to claim 1, wherein
the five or more kinds of color filters include a blue filter, a dark green filter, a green filter, a light green filter, an orange filter and a red filter,
the first interpolation unit is configured to perform the interpolation to the color information of the dark green filter and the orange filter, and
the second interpolation unit is configured to perform interpolation to the color information of the blue filter and the green filter by using the result of the interpolation to the color information of the dark green filter by the first interpolation unit, and to perform the interpolation to the color information of the light green filter and the red filter by using the result of the interpolation to the color information of the orange filter by the first interpolation unit.

5. An image processing method comprising:
obtaining mosaic image data by shooting a subject with use of a color image sensor in which five or more kinds of color filters are arranged in front of an image pickup device;
performing interpolation to color information of a high-definition color filter, in regard to the obtained mosaic image data; and
performing interpolation to color information of a low-definition color filter of which a peak wavelength in spectral transmittance is adjacent to that of the high-definition color filter, by using a result of the interpolation to the color information of the high-definition color filter,
wherein the mosaic image data is image data which has one color information for each pixel, and
the five or more kinds of color filters include high-definition color filters and low-definition color filters.

6. The image processing method according to claim 5, wherein
the five or more kinds of color filters include a blue filter, a dark green filter, a green filter, a light green filter, an orange filter and a red filter,
the interpolation to the color information of the high-definition color filter is performed to the color information of the dark green filter and the orange filter, and
the interpolation to the color information of the low-definition color filter of which the peak wavelength in the spectral transmittance is adjacent to that of the high-definition color filter is performed to the color information of the blue filter and the green filter by using the result of the interpolation to the color information of the dark green filter, and the interpolation to the color information of the low-definition color filter of which the peak wavelength in the spectral transmittance is adjacent to that of the high-definition color filter is performed to the color information of the light green filter and the red filter by using the result of the interpolation to the color information of the orange filter.

7. A non-transitory computer-readable storage medium which stores therein a program for causing a computer to perform an image processing method comprising:
obtaining mosaic image data by shooting a subject with use of a color image sensor in which five or more kinds of color filters are arranged in front of an image pickup device;
performing interpolation to color information of a high-definition color filter, in regard to the obtained mosaic image data; and
performing interpolation to color information of a low-definition color filter of which a peak wavelength in spectral transmittance is adjacent to that of the high-definition color filter, by using a result of the interpolation to the color information of the high-definition color filter,
wherein the mosaic image data is image data which has one color information for each pixel, and
the five or more kinds of color filters include high-definition color filters and low-definition color filters.

8. The non-transitory computer-readable storage medium according to claim 7, wherein, in the image processing method,
the five or more kinds of color filters include a blue filter, a dark green filter, a green filter, a light green filter, an orange filter and a red filter,
the interpolation to the color information of the high-definition color filter is performed to the color information of the dark green filter and the orange filter, and
the interpolation to the color information of the low-definition color filter of which the peak wavelength in the spectral transmittance is adjacent to that of the high-definition color filter is performed to the color information of the blue filter and the green filter by using the result of the interpolation to the color information of the dark green filter, and the interpolation to the color information of the low-definition color filter of which the peak wavelength in the spectral transmittance is adjacent to that of the high-definition color filter is performed to the color information of the light green filter and the red filter by using the result of the interpolation to the color information of the orange filter.

9. A color image sensor comprising:

five or more kinds of color filters of which peak wavelengths in spectral transmittance or full widths at half-maximum are different from others are arranged in front of an image pickup device, wherein, among the five or more kinds of color filters, a first color filter and a second color filter each of which has definition higher than those of other arranged color filters are arranged alternately in a predetermined direction, the first color filter and the color filter of which the peak wavelength in the spectral transmittance is adjacent to that of the first color filter are arranged alternately in a predetermined direction, and the second color filter and the color filter of which the peak wavelength in the spectral transmittance is adjacent to that of the second color filter are arranged alternately in a predetermined direction.

10. The color image sensor according to claim 9, wherein a first filter group which is composed of the first color filter and the color filters of which the peak wavelengths in the spectral transmittance are adjacent to that of the first filter and a second filter group which is composed of the second color filter and the color filters of which the peak wavelengths in the spectral transmittance are adjacent to that of the second filter are arranged in a Bayer arrangement.

11. The color image sensor according to claim 9, wherein the first color filter and the second color filter are arranged so that the first color filter and the second color filter are adjacent to each other.

12. The color image sensor according to claim 9, wherein the first color filter and the second color filter are, among the five or more kinds of color filters, the color filters other than the color filter of which the peak wavelength in the spectral transmittance is shortest and the color filter of which the peak wavelength in the spectral transmittance is longest.

13. The color image sensor according to claim 9, wherein
the five or more kinds of color filters include a blue filter, a dark green filter, a green filter, a light green filter, an orange filter and a red filter, and
the first color filter is the dark green filter and the second color filter is the orange filter.

* * * * *